Oct. 15, 1957      J. D. RICHARD, JR      2,809,520
FLUID VELOCITY MEASURING APPARATUS
Filed March 1, 1954
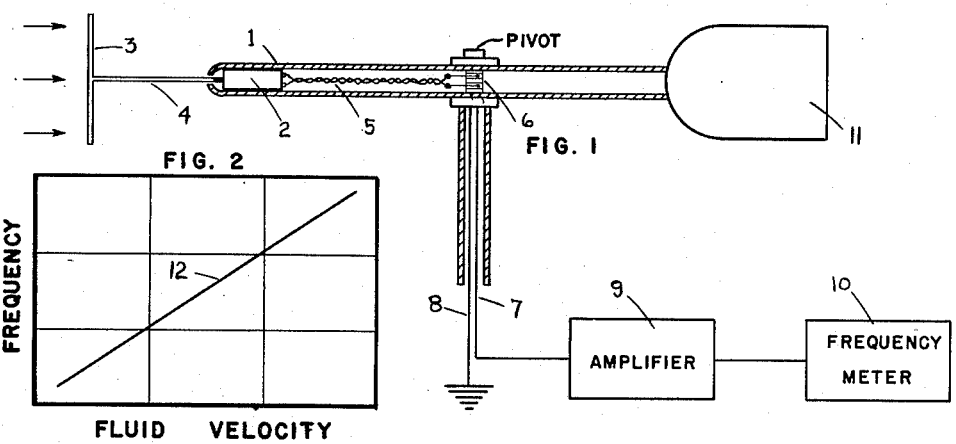
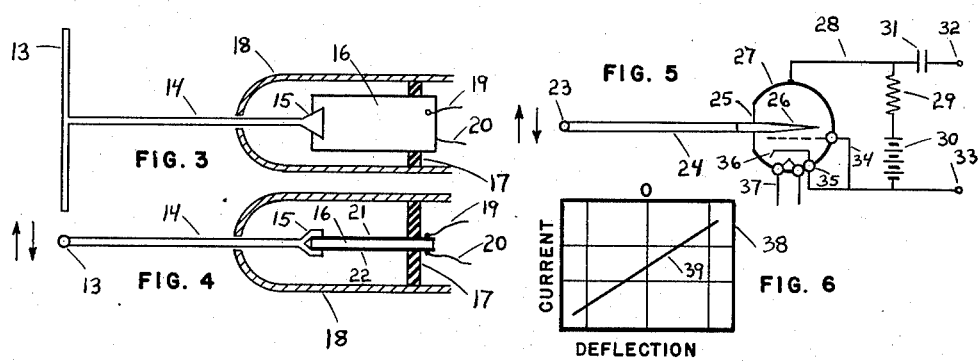
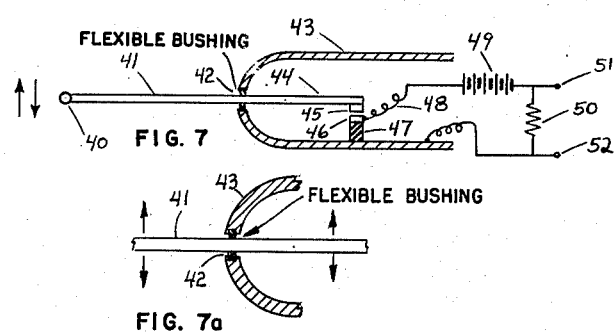
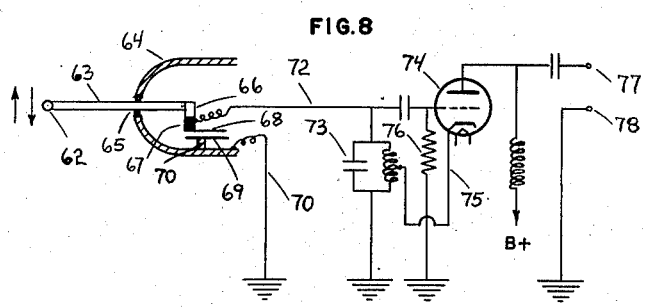
INVENTOR
Joseph D. Richard Jr.

United States Patent Office 2,809,520
Patented Oct. 15, 1957

2,809,520

FLUID VELOCITY MEASURING APPARATUS

Joseph D. Richard, Jr., South Miami, Fla.

Application March 1, 1954, Serial No. 413,343

2 Claims. (Cl. 73—189)

This invention relates to the measurement of fluid velocity. More specifically, the present invention is directed to apparatus for measuring the velocity of a moving fluid medium relative to an elongated member which is maintained with its major axis essentially normal to the direction of fluid movement by means of a non-rigid support.

In the past, various devices have been used for measuring fluid velocity. In general these can be divided into three classes—deflection, rotational, and pressure differential types. The first two types have the disadvantages of requiring hinged and rotating parts respectively. Pressure differential types require complex transducing systems, particularly when the fluid velocity is to be telemetered to some remote location.

An object of my invention is to provide apparatus for measuring the velocity of a moving fluid medium.

Another object of my invention is to provide a means for measuring fluid velocity without requiring the use of rotating parts or other mechanisms where friction can be a source of calibration error.

Still another object of my invention is to provide a means for measuring fluid velocity whereby said velocity is determined directly by an oscillation frequency which can be telemetered conveniently.

Other objects of my invention will become more apparent from a study of the specification and drawings in which various embodiments are shown and described.

Briefly, the present invention involves the utilization of the phenomenon known as aeolian tones for the measurement of fluid velocities. Aeolian tones are often produced when the wind blows over telegraph wires or other slender obstacles such as the needles on a pine tree. They may also be heard when a slender rod or a whip is swung rapidly through the air. The effect is the same whether the wind blows past the wire or the wire moves through the air. There are various references in history of musical instruments which were played by the wind. These instruments were known as aeolian harps and consisted simply of a number of strings stretched at right angles to the direction of the wind. Such instruments produce an audible tone when the wind blows across the strings.

A number of experiments have been made to explain the nature of this phenomenon. The most important investigations were made by Vincent Strouhal, Lord Raleigh, Theodor von Karman, and H. Rubach.

The tones are caused by an alternating system of vortices formed in the wake of an obstacle (such as a wire) as a moving fluid flows past. The periodic shedding of these vortices produces a periodic transverse vibration of the obstacle if it is free to move. The present invention relates to the utilization of the frequency of this transverse vibration as a means of measuring the velocity of the moving fluid. For these specifications, a cylindrical member or length of wire is used as an example of such an obstacle maintained by means of a non-rigid support with its major axis substantially normal to the direction of fluid flow. The cylindrical member is free to vibrate sidewise, or transverse to the direction of fluid flow. It should also be pointed out that, for purposes of this invention, the transverse vibrations need not be of such intensity as to produce an audible tone directly since various means are provided for sensing these vibrations with transducers which convert the mechanical vibration into electrical signals.

If air flows past a mounted vertical wire with sufficient velocity, transverse vibrations are set up. The frequency of these vibrations is independent of both the length and tension of the wire. The frequency can be represented approximately by the expression $$f = K\frac{V}{D}$$

where $f$ is the frequency of the vibration, V is the velocity of the air, D the diameter of the wire, and K a constant which is about .2. The explanation of the phenomenon and the theoretical justification of this empirical relationship is well described in various texts concerning acoustics.

The frequency is found to be little affected by the viscosity of the fluid. The dimensions of the coefficient of kinematic viscosity $v$ are $L^2T^{-1}$. If this quanity is to occur in the expression for the frequency of the transverse vibration along V and D, a consideration of dimensions shows that it must do so in the form of the dimensionless Reynolds number $$N = \frac{VD}{v}$$

so that $$f = \frac{V}{D}F(N)$$

where F is a constant and N the Reynolds number.

Raleigh gives the following formula as agreeing well with observations both for water ($v=.0115$ c. g. s.) and air ($v=.15$ c. g. s.).

$$f = .195\frac{V}{D}\left(1 - \frac{20.1}{N}\right)$$

Since in the cases occurring in practice N is usually greater than 500, the second term in the expression is very small, and we have approximately $$f = .2\frac{V}{D}$$

Though the effect of the value of N on the frequency is small, its effect on the initiation of the vortices (and the resulting vibrations) is determinative. When the fluid streams past an obstacle a region of stationary fluid tends to be established in the rear of the obstacle. Shearing forces are developed by the viscosity acting across the layer which separates this dead fluid from the moving stream, and it is here that the vortices tend to develop. If N falls below about 100 (i. e., for thin wires and low velocities) vortices cease to be formed and the phenomenon disappears. For air $v=.15$ and the critical velocities (i. e., velocity at which vortices begin to form) for wires of various diameters may therefore be found by putting $$V_c = \frac{15}{D}$$

For water $v=.0115$ and the critical velocities for wires of various diameters may be found $$V_c = \frac{1.15}{D}$$

For example a wire of 1 cm. diameter would require an air velocity of approximately 150 cm./sec. to initiate vortices, while the same wire would, in water, require a fluid velocity of about 11.5 cm./sec. to initiate vortices.

The present invention utilizes the principles described for the measurement of fluid velocity. A cylindrical member, free to vibrate, is positioned at right angles to the direction of fluid flow. Various transducing means are employed to convert the transverse mechanical vibrations into electrical signals. Means for measuring the frequency of these electrical signals are provided.

Several embodiments of the present invention will now be described in detail in conjunction with the accompanying drawings in which:

Figure 1 shows a side view of a fluid velocity measuring system according to my invention.

Figure 2 shows the variation of frequency with fluid velocity for a fluid velocity measuring system of the type shown in Fig. 1.

Figure 3 shows a side view of a specific form of my invention in which a piezoelectric element is used as the transducing means.

Figure 4 shows a top view of the device shown in Fig. 3.

Figure 5 shows schematically a top view of another specific form of my invention in which a mechanico-electronic transducer is used as the transducing means.

Figure 6 shows the variation in plate current of the mechanico-electronic transducer for deflections of the sensing element.

Figure 7 shows a top view of a specific form of my invention in which the vibrations of the sensing element causes a pair of contacts to make intermittently.

Figure 7A shows the flexible bushing which supports the elongated arm.

Figure 8 shows schematically the top view of a form of my invention in which the vibrations of the sensing element cause the oscillations of a vacuum tube oscillator to be frequency modulated.

Referring more specifically to Fig. 1 numeral 1 denotes a tubular member which is pointed in the direction from which a fluid flows by means of the vane 11. A transducer 2 is mounted in the tubular member 1. The transducer 2 converts mechanical vibrations transmitted by the arm 4 into electrical signals. An elongated cylindrical member 3, is maintained in a position normal to the direction of fluid flow by means of the arm 4. A pair of conducting leads 5 connect the transducer 2 to the slip ring assembly 6. A pair of conducting leads 7 and 8 connect the slip ring assembly to the amplifier 9. The frequency of the amplified electrical signals can be indicated by the frequency meter 10.

Figure 2 shows by means of the curve 12 the relationship that exists between the vibration frequency of the velocity sensing cylindrical member 3 and the velocity of the fluid medium.

Figure 3 shows an elongated cylindrical sensing element 13 maintained by means of the arm 14 in a position substantially normal to the direction of a fluid flow. The arm 4 is attached by means of the clamp 15 to a piezoelectric element 16. The piezoelectric element 16 represents a bender type bimorph crystal and is held by means of the insulated support 17 in the end of a tubular member 18. Electrical leads 19 and 20 are connected to the electrodes 21 and 22.

Figure 4 shows a top view of the same device shown in Fig. 3.

Figure 5 shows a top view of an elongated cylindrical sensing element 23 which is maintained by means of the arm 24 in a position substantially normal to the direction of a fluid flow. The arm 24 is mechanically coupled to the extension of the movable plate 26 of a mechanico-electronic transducer. The flexible metal diaphragm 25 allows the vibrations of the element 23 to be transmitted by means of the arm 24 to the movable plate 26. A voltage source 30 is connected through the resistance 29 to the metal shell 27. The cathode 36 is connected through the insulated feed-in 35 to the negative side of the voltage source 30.

Figure 6 is a curve 39 showing the variation of plate current as a function of the angular deflection of the arm 24.

Figure 7 shows a top view of an elongated cylindrical sensing element 40 which is maintained by means of arm 41 in a position substantially normal to the direction of a fluid flow. The arm 41 pivots at 42 so that deflections of the arm 41 result in corresponding deflection of the inner arm 44. An electrical contact 45 is attached to the inner arm 44 and the inner arm 44 provides an electrical path between the contact 45 and the tubular outer shell 43. An electrical contact 46 is supported by means of insulator 47 and arranged opposite the first contact 45. A voltage source 49 is connected through the resistance 50 between the contact 46 and the tubular outer shell 43.

Figure 8 shows a top view of an elongated cylindrical element 62 which is maintained by means of the arm 63 in a position substantially normal to the direction of a fluid flow. The arm 63 pivots at the point 65 so that deflections of the arm 63 result in corresponding deflections of the insulator 66 which supports the conducting terminal 67 to which is attached a lead 72 and a condenser plate 68. A fixed condenser plate 70 is arranged opposite 68 and is electrically connected to ground. The capacitance between the plates 68 and 70 is arranged in parallel with the capacitance 73 which is part of the tank circuit of a conventional Hartley oscillator.

Returning now to Figure 1, the operation of the fluid velocity measuring means will be described in more detail. The direction of a fluid flow is indicated by the arrows. The elongated cylindrical member 3 is maintained by means of the arm 4 in position with its major axis normal to the direction of fluid flow. The alternating vortices formed in the wake of the cylindrical member 3 result in an alternating transverse vibration, the frequency of which is proportional to the fluid velocity and inversely proportional to the diameter of the cylindrical member 3. The transverse vibrations are in a direction normal to both the direction of fluid flow and the major axis of the cylindrical member 3. The vibrations of the cylindrical member 3 are transmitted by means of the arm 4 to the transducer 2. The transducer 2 converts these mechanical vibrations into corresponding electrical signals which can be amplified and the frequency determined. With a cylindrical element of a given diameter, the fluid velocity can be measured as a function of the frequency of these transverse vibrations.

Referring to Figure 1, the transducer 2 is a generalized, schematic showing of any transducer capable of converting mechanical motion into corresponding electrical signals. Specific transducers are shown in some of the other drawings. Figure 1 is intended to show the overall organization of a fluid velocity measuring apparatus. The element 1 provides a frame of reference to which the transducer 2 is fixed. Lateral movements of the rod 4 relative to 1 and 2 therefore actuate the transducer 2. Transverse vibrations of the cylindrical member 3 likewise actuate the transducer 2.

Figure 3 shows a piezoelectric bender bimorph 16 as an example of one type transducer which can be used. Vibrations of the cylindrical member 13 cause corresponding deflections of the arm 14 and the crystal 16. The resulting electrical signals across wire 19 and 20 can be amplified and the frequency measured. In Figures 3 and 4 the crystal 16 can be considered the sole bendable connection of rod 14 to the element 1. The rod 14 must be substantially rigid in order to flex the bimorph crystal 16.

In Figure 5 the deflections of the arm 24 by the vibrating cylindrical member 23 cause corresponding deflections of the movable plate 26 in the mechanico-electronic transducer. The resulting variations in plate current cause an alternating voltage to appear across the resistance 29 the frequency of which corresponds to the frequency of the vibrations of the cylindrical member 23. This alternating voltage can be amplified and its frequency determined. In Figure 5 the diaphragm 25 constitutes the sole pivot for the rod 24. The plate electrode 26 actually projects through the diaphragm 25 and it is fixed to the rod 24 on the outside of the vacuum envelope. The transducer shown in Figure 5 is the RCA 5734 triode mechanico-electronic transducer.

In Figure 7 the arm 41 pivots at the point 42 and when alternating deflections of 41 occur the contacts 45 and 46 are made and broken intermittently. The frequency of the resulting intermittent voltage that appears across the resistance 50 can be measured.

In Figure 8 the arm 63 pivots at point 65 in such a manner that deflections of 63 cause corresponding deflections of the insulator 66 and the attached conducting electrode 67 with the condenser plate 68. As the cylindrical member 62 vibrates in a transverse direction, the movable condenser plate 68 vibrates at the same frequency. The capacitance between the plates 68 and 69 varies accordingly, and since this capacitance is in parallel with the capacitor 73 in the Hartley oscillator, the oscillations of the Hartley oscillator are frequency modulated at the vibration frequency of the cylindrical member 62. In Figures 7 and 8, the pivots 42 and 65 consist of flexible rubber bushings which furnish support for the rods 41, 63 and hold them firmly in position. The rubber bushings serve to pivot the rods 41, 63 when the cylindrical elements 40 and 62 are displaced in the directions of the arrows. The bushings 42 and 65 are shown schematically in the drawing to illustrate their pivoting function and do not resemble the cross section shape of a rubber bushing.

The apparatus described in the present invention are applicable to the measurement of fluid velocity in a wide variety of circumstances. The velocity of fluid flow in a pipe or conduit can be measured as well as unconfined flowing fluids such as wind, river flow, and ocean currents. There are many possible apparatus for sensing the transverse vibrations of the suspended elongated member besides the few examples shown in the drawing. For example, magnetic pickups, inductive pickups, mutual inductive pickups, and certain types of unbonded strain gauges could all be adapted to serve this function.

The apparatus shown for suspending the primary sensing element represent only a few of the possible arrangements. The wire or rod can be suspended from both ends with the transducer at either end or at some intermediate point. As an example, a wire can be suspended from both ends with one end attached to the armature of a variable reluctance pickup.

The elongated primary sensing element need not be cylindrical. Although sensing elements with a round cross section are shown in the specifications, cross sections of other shapes also respond to the same phenomenon. As an example, an oval shaped cross section has been used successfully. A V-shaped cross section with the point of the V facing into the current also responds to the alternating vortices. In all cases, however, the dimensions of the "obstruction" behind which the vortices form and the velocity of the flowing fluid are the factors which determine the rate at which the vortices are shed into the slip stream and consequently the frequency of the transverse displacements caused by this shedding of vortices.

It will be apparent that these specifications will be suggestive of numerous modifications to others skilled in the art; hence, it should be understood that my invention is not limited by the specific construction herein described, which is merely an exemplary embodiment, and should be restricted only insofar as set forth in the claims.

The nature and objects of the present invention having been fully described and illustrated, what I wish to claim as new and useful is:

1. Apparatus for measuring the velocity of a fluid flow comprising in combination: an elongated, substantially rigid body member; pivoting means near the center portion of said body member, said body member being thereby free to rotate in a horizontal plane when suitably supported at said pivot; a vane attached to one end of said body member, said body member being thereby aligned in a fluid flow; an elongated support member yieldably attached to, and projecting axially from, the end of said body member opposite from said vane, said support member being capable of at least slight transverse motion in response to transverse forces; an elongated cylindrical member fixed to the extreme end of said support member away from said body member, said cylindrical member being positioned substantially at right angles to said support member, said cylindrical member being capable of transverse vibration in response to a fluid flow, said vibration being mechanically transmitted to the said support member; transducing means mounted within said body member, said transducing means being capable of converting mechanical forces into corresponding electrical signals, said transducing means having a mechanical input element which when displaced causes a varying electrical output signal from said transducing means; mechanical coupling means between the said elongated support member and the said mechanical input element of said transducing means, the said transducing means thereby producing a varying electrical output in response to transverse vibrations of the said elongated cylindrical member vibrating in a fluid flow, the frequency of the varying electrical output being a function of the velocity of the fluid flow in accordance with known fluid dynamic principles; a source of electrical current supplying the output of said transducing means; and means for measuring the frequency of the varying output current of said transducing means, said frequency being calibrated in terms of velocity of fluid flow.

2. Apparatus for measuring the velocity of a fluid flow comprising in combination: an elongated, substantially rigid body member; pivoting means near the center portion of said body member, said body member being thereby free to rotate in a horizontal plane when suitably supported at said pivot; a vane attached to one end of said body member, said body member being thereby aligned in a fluid flow; a plurality of slip rings mounted within said body member, said slip rings being concentric with the axis of the said pivoting means; a mechanical to electrical transducer mounted within said body member opposite the said vane, said transducer having a mechanical input member and electrical output terminals, said transducer being capable of producing variations in an electrical current in response to mechanical displacements of the said mechanical input member; an elongated support member mechanically coupled to the mechanical input element of the said transducer, said support member yieldably connected to and projecting axially from the end of the said body member opposite the said vane, said support member being capable of at least slight transverse motion; an elongated cylindrical member fixed to the extreme end of the said support member opposite the said body member, said cylindrical member being positioned at right angles to the axis of the said body member, said cylindrical member being capable of transverse motion in response to transverse forces, said transverse motion being mechanically coupled to the mechanical input member of the said transducer by means of the said support member; a plurality of brush elements in electrical contact with the said slip rings; electrical conducting means between the said electrical output terminals of the said transducer and the said brush elements; and means for indicating the frequency of the electrical signals across the said slip rings.

References Cited in the file of this patent

UNITED STATES PATENTS 1,215,135   Fisher _____ Feb. 6, 1917

(Other references on following page)

UNITED STATES PATENTS

| | | |
|---|---|---|
| 1,935,445 | Heinz | Nov. 14, 1933 |
| 1,953,819 | Payne | Apr. 3, 1934 |
| 1,987,617 | Graham et al. | Jan. 15, 1935 |
| 2,111,036 | Wippel | Mar. 15, 1938 |
| 2,491,390 | Olson | Dec. 13, 1949 |
| 2,495,258 | Iatesta | Jan. 24, 1950 |
| 2,519,015 | Bensen | Aug. 15, 1950 |
| 2,561,763 | Waters | July 24, 1951 |
| 2,586,010 | Divoll | Feb. 19, 1952 |

FOREIGN PATENTS

| | | |
|---|---|---|
| 646,261 | France | July 10, 1928 |